United States Patent [19]
Gulick et al.

[11] Patent Number: 5,797,028
[45] Date of Patent: Aug. 18, 1998

[54] COMPUTER SYSTEM HAVING AN IMPROVED DIGITAL AND ANALOG CONFIGURATION

[75] Inventors: Dale E. Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[21] Appl. No.: 526,488

[22] Filed: Sep. 11, 1995

[51] Int. Cl.$^6$ ........................................... G06F 15/00
[52] U.S. Cl. .......................... 395/800.32; 364/228.6; 364/DIG. 1
[58] Field of Search .................. 395/800, 800.32, 395/800.35, 800.01; 364/489, 228.6, DIG. 1

[56] References Cited

U.S. PATENT DOCUMENTS

| | | | |
|---|---|---|---|
| 4,742,544 | 5/1988 | Kupnicki et al. | 380/14 |
| 5,027,214 | 6/1991 | Fujimori | 348/233 |
| 5,091,951 | 2/1992 | Ida et al. | 381/63 |
| 5,111,409 | 5/1992 | Gasper et al. | 395/807 |
| 5,210,806 | 5/1993 | Kihara et al. | 381/103 |
| 5,434,913 | 7/1995 | Tung et al. | 379/202 |
| 5,592,391 | 1/1997 | Muyshondt et al. | 364/489 |

OTHER PUBLICATIONS

PCI Local Bus—*PCI Multimedia Design Guide*—Revision 1.0—Mar. 29, 1994, 43 pages.

*Primary Examiner*—John E. Harrity
*Attorney, Agent, or Firm*—Conley, Rose & Tayon; Jeffrey C. Hood

[57] ABSTRACT

A computer system including separate digital and analog system chips which provides increased performance over current computer architectures. The computer system of the present invention includes a digital system chip which performs various digital functions, including multimedia functions and chipset functions, and a separate analog chip which performs analog functions, including digital to analog and analog to digital conversions. Thus the present invention optimizes silicon use and design by splitting up digital and analog functions on separate chips. The system of the present invention also separates digital noise from analog noise, allowing a higher degree of integration while increasing stability.

32 Claims, 11 Drawing Sheets

COMPUTER SYSTEM HAVING AN IMPROVED DIGITAL AND ANALOG CONFIGURATION

FIELD OF THE INVENTION

The present invention relates to a computer system having separate digital and analog system chips which is optimized for real-time multimedia and communications applications, wherein the digital chip integrates digital portions of multimedia and communications processing and the analog chip integrates analog portions of multimedia and communications processing.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia and communications applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia and/or communication hardware as part of the system, and thus the system is not optimized for multimedia applications. Rather, multimedia and/or communication hardware is typically designed as an add-in card for optional insertion in an expansion bus of the computer system.

In many cases, multimedia hardware cards situated on an expansion bus do not have the required access to system memory and other system resources for proper operation. In addition, since the computer system architecture is not optimized for real-time applications, multimedia and communications hardware cards generally do not make efficient use of system resources. As an example, hardware cards which perform video, audio and/or communications functions each typically include a digital portion which processes digital data and an analog portion which processes analog data.

For example, a video card includes digital circuitry which performs polygon rendering, texture mapping and other pixel manipulation operations, and also includes the digital memory portion of a RAMDAC (random access memory digital to analog converter). A video card also includes analog circuitry which performs the digital to analog conversion and generates RGB (red, green and blue) analog voltages which drive a video monitor. Likewise, a sound card includes digital circuitry which performs audio processing functions such as MIDI, wavetable synthesis, etc., and also includes analog circuitry to generate the appropriate analog audio signals that are provided to the speakers.

As multimedia and communication applications become more prevalent, multimedia and communication hardware will correspondingly become essential components in personal computer systems. Therefore, an improved computer system architecture is desired which is optimized for multimedia and communication applications as well as for non-realtime applications.

SUMMARY OF THE INVENTION

The present invention comprises a computer system which provides increased performance over current computer architectures. The computer system of the present invention includes a digital system chip which performs various digital functions, including multimedia and communication functions, and a separate analog chip which performs analog functions. Thus the present invention optimizes silicon use and design by splitting up digital and analog functions on separate chips. The system of the present invention also separates digital noise from analog noise, allowing a higher degree of integration while increasing stability.

In the preferred embodiment, the computer system includes a CPU coupled through chip set or bridge logic to main memory. The bridge logic also couples to a local expansion bus such as the PCI bus. Various devices may be connected to the PCI bus, including a network interface card, as well as other peripherals. The bridge logic and main memory also couple to a digital system chip which performs various digital functions in the computer system. In one embodiment, the digital system chip couples directly to the CPU and main memory, and the digital system chip includes the PCI bridge logic, the main memory controller logic, and other chipset logic.

The digital system chip includes one or more DSP engines that perform video, graphics, audio and/or telephony applications. The DSP engines may comprise either dedicated video, audio and/or communication engines or general purpose DSP engines. The digital system chip also performs various digital operations in the computer system, including one or more of power management functions, floppy controller functions, serial and parallel I/O port functions, and hard disk interface functions. As desired, the digital system chip may perform other functions, including, EIDE support and SCSI support. Thus the digital system chip performs a number of real-time digital functions, including audio and video functions, as well as others.

An analog system chip is connected directly to the digital system chip and performs various analog functions, including analog-to-digital (A/D) conversion and digital to analog (D/A) conversion for various functions, including video, audio, modem functionality, and a telephone handset, among others. In one embodiment, the analog system chip only includes analog portions of the A/D and D/A logic functionality, and the digital portion of the A/D and D/A logic is comprised in the digital system chip. The analog system chip further includes video ports for coupling to a video monitor, audio ports for coupling to an audio DAC or speakers, and one or more communication ports for transferring analog information. In one embodiment, the analog system chip includes one or more of a radio transceiver, infrared (IR) transceiver, analog mixer, and a NTSC (National Television Standards Committee) converter. The analog system chip further includes analog inputs for receiving input from various peripherals, such as a microphone, CD-ROM, stereo system and TV tuner, among others.

In an alternate embodiment, the digital system chip couples to the PCI bus. The digital system chip may be comprised on the motherboard or, alternatively, the digital chip is comprised on a modular expansion card adapted for insertion into a connector slot on the PCI bus, thus allowing for improved modularity and upgradeability. The analog system chip preferably couples directly to the digital system chip, and the analog system chip couples to various peripherals, including a monitor and speakers.

In one embodiment, the computer system includes a separate intermediate bus coupled between the digital system chip and the analog system chip. In this embodiment, one or more digital system chips are coupled to the PCI bus, wherein the one or more digital system chips connect to the intermediate bus. One or more analog system chips are also coupled to the intermediate bus. This configuration allows for improved modularity and upgradeability. This configuration also allows communication between each of the digital system chips and analog system chips, as well as communication between the respective digital system chips and communication between the respective analog system chips.

Therefore, the present invention comprises a novel computer system architecture which increases the performance of real-time applications. A dedicated digital system chip is included in the system which performs various digital multimedia and communication operations, and an analog system chip is coupled directly to the digital system chip which performs various corresponding analog functions. This separation of digital and analog functionality optimizes silicon use and reduces noise issues while also providing improved performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

PCI System Architecture by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

U.S. Pat. No. 4,994,801 titled "Apparatus Adaptable for Use in Effecting Communication Between an Analog Device and a Digital Device", which was filed on Oct. 30, 1989, and which issued Feb. 19, 1991, whose inventors are Saf Asghar, John Bartkowiak, and Miki Moyal, and which is assigned to Advanced Micro Devices Corporation, is hereby incorporated by reference in its entirety.

Computer System Block Diagram

Figure 1:
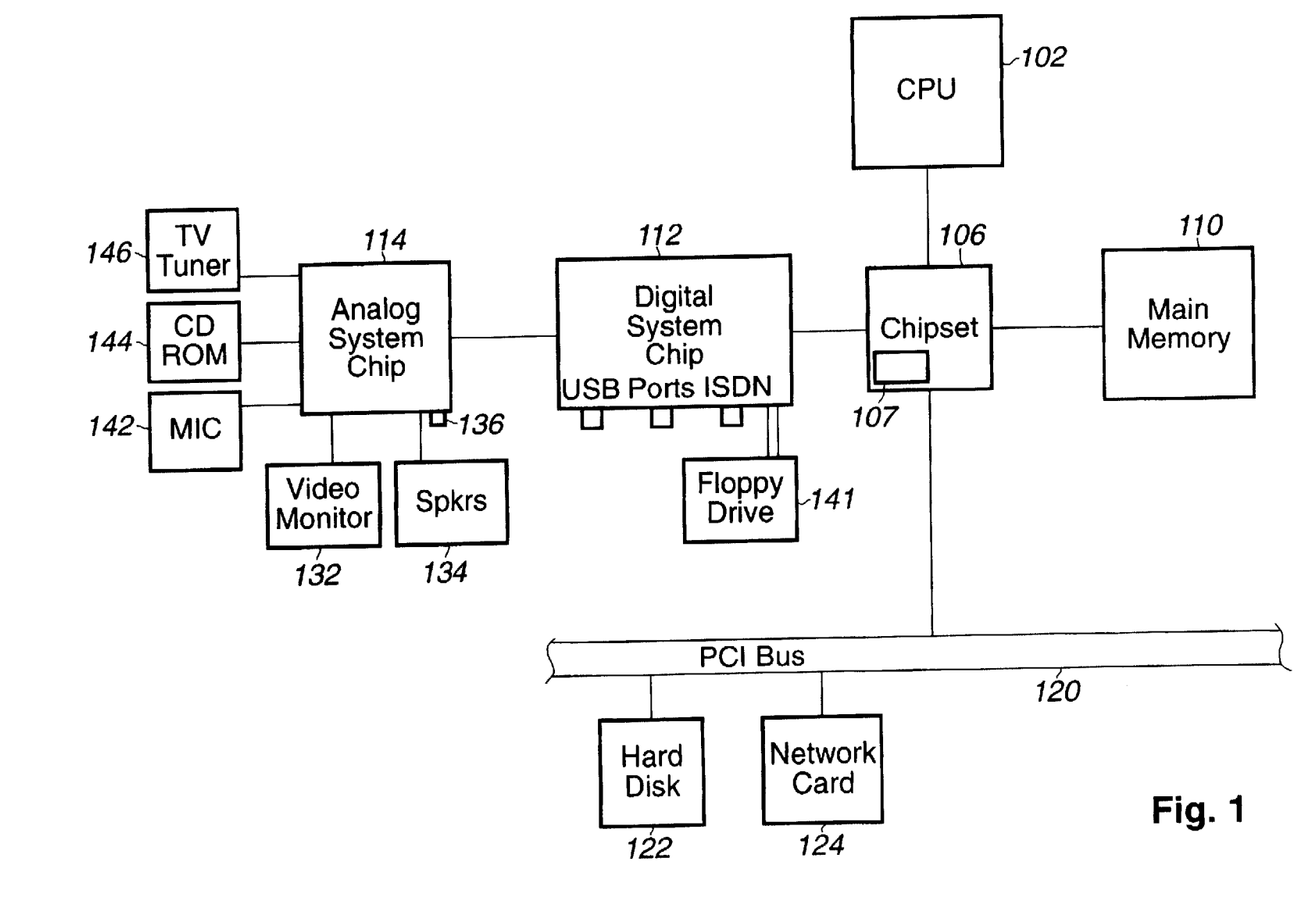
FIG. 1 is a block diagram of a computer system including a digital system chip and an analog system chip according to the preferred embodiment of the present invention.

Referring now to FIG. 1, a block diagram of a computer system according to the present invention is shown. As shown, the computer system includes a central processing unit (CPU) 102 which is coupled through a CPU local bus to a host/PCI/cache bridge or chipset 106. The chipset includes arbitration logic 107 as shown. The chipset 106 is preferably similar to the Triton chipset available from Intel Corporation. A second level or L2 cache memory (not shown) may be coupled to a cache controller in the chipset, as desired. The bridge or chipset 106 couples through a memory bus 108 to main memory 110. The main memory 110 is preferably DRAM (dynamic random access memory) or EDO (extended data out) memory, as desired.

The host/PCI/cache bridge or chipset 106 also interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120.

In the embodiment shown in FIG. 1, a digital system chip 112 according to the present invention is coupled to the chipset 106. The digital system chip 112 performs various digital functions, including multimedia functions such as video and audio, as discussed further below. The digital system chip 112 includes a Universal Serial Bus (USB)

interface as well as a parallel/serial port interface. The digital system chip 112 also preferably includes an ISDN (Integrated Services Digital Network) interface. The digital system chip 112 also preferably couples to floppy drive 141. Various other devices may be coupled to the digital system chip 112. such as a hard drive or other digital devices. The digital system chip 112 preferably only comprises digital circuitry.

The digital system chip 112 preferably communicates with devices on the PCI bus 120 through the chipset 106. In one embodiment, the digital system chip 112 includes a PCI interface for coupling directly to the PCI bus 120. In this embodiment, the digital system chip 112 can arbitrate for the PCI bus and can communicate directly with devices on the PCI bus with less involvement of the chipset logic 106. The digital system chip 112 is also preferably coupled to other devices in the computer system to perform power management functions, as well as other functions, as desired.

An analog system chip 114 is coupled to the digital system chip 112. The analog system chip 114 performs various analog functions, including analog to digital (A/D) conversion, digital to analog (D/A) conversion, and modem functionality, among others. The analog system chip 114 is coupled to provide outputs to various analog devices, including a video monitor 132 and speakers 134. The analog system chip 114 also includes an analog modem output 136 for coupling to a telephone line. The analog system chip 114 also couples to various devices to receive various analog inputs, including a microphone 142, a CD-ROM 144, and a TV tuner 146. It is noted that only the analog output of the CD-ROM is provided to the analog system chip 114. The analog system chip 114 preferably substantially comprises analog circuitry, and preferably only includes digital "front-end" circuitry for interfacing to the digital system chip 112.

Various devices may be coupled to the PCI bus 120. For example, a hard disk 122 and a network interface controller 124 are shown coupled to the PCI bus 120. A SCSI (small computer systems interface) adapter (not shown) may also be coupled to the PCI bus 120. In one embodiment, the digital system chip 112 includes a hard disk interface for coupling to a hard disk and a SCSI interface for coupling to SCSI devices. In addition, the digital system chip 112 may also include network interface circuitry such as Ethernet or token ring circuitry for interfacing to a network. However, in the preferred embodiment, the digital system chip 112 does not include network circuitry, but rather network functions are performed by a modular network card coupled to the PCI bus 120. Various other devices may be connected to the PCI bus 120, as is well known in the art.

Expansion bus bridge logic (not shown) is also preferably coupled to the PCI bus 120. The expansion bus bridge logic interfaces to an expansion bus (not shown). The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus, such as expansion bus memory (not shown).

Digital System Chip Block Diagram

Figure 2:
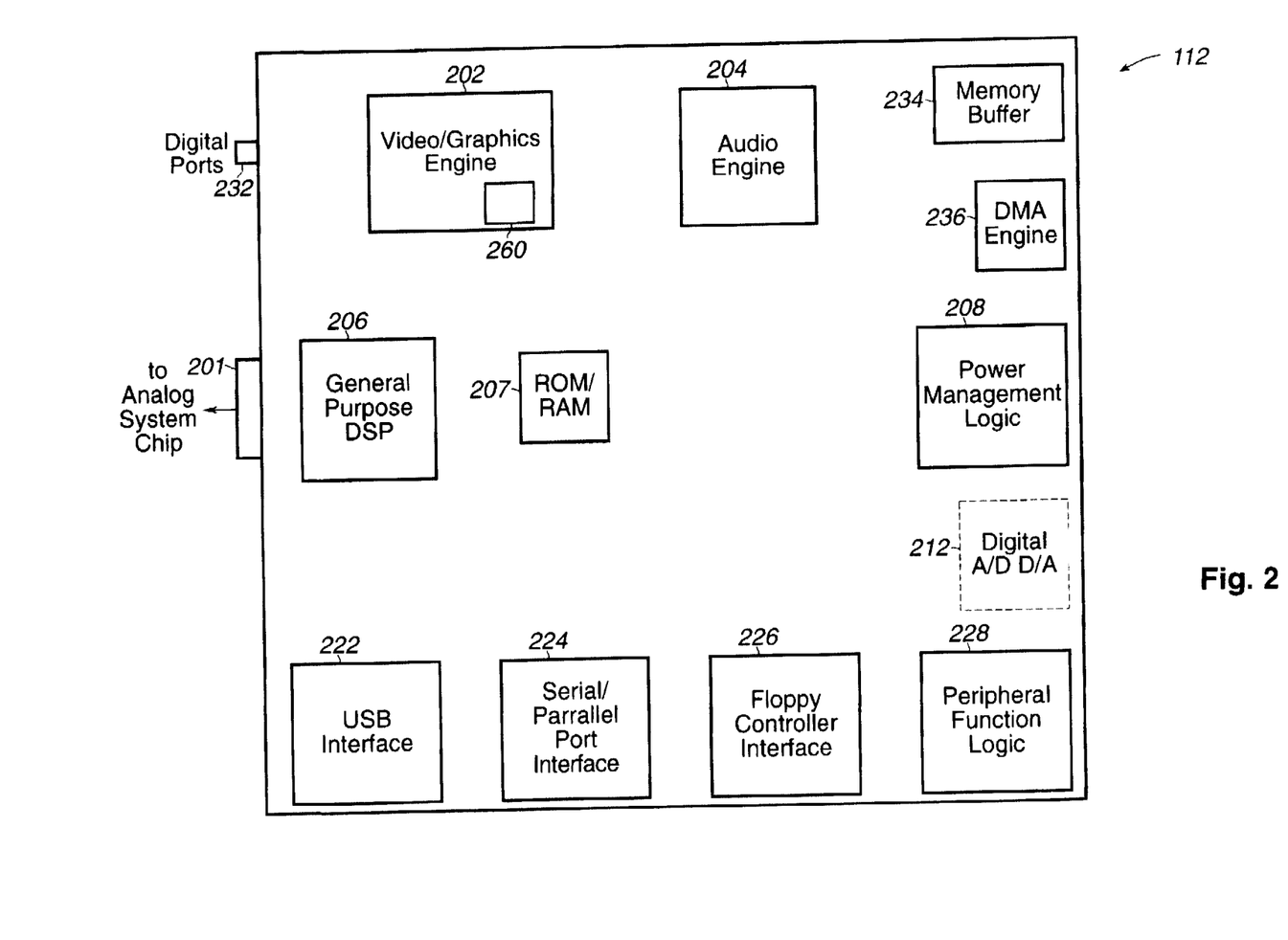
FIG. 2 is a block diagram of the digital system chip of FIG. 1.

Referring now to FIG. 2, a more detailed block diagram illustrating the digital system chip 112 is shown. The digital system chip 112 includes a connector 201 for connecting to analog system chip 114, and also includes a connector 203 for coupling to the chipset logic 106. Although not shown in FIG. 2, the various devices in the digital system chip 112 are interconnected through respective data channels or signal traces to form a functional unit. The digital system chip 112 also preferably includes one or more input/output (I/O) channels for transmitting data to the analog system chip 114 and to the chipset logic 106.

In the preferred embodiment shown in FIG. 2, the digital system chip 112 includes a video/graphics engine 202 which performs video and graphics operations such as polygon rendering, texture mapping, and other pixel manipulation operations, among others. The video/graphics engine 202 performs operations similar to currently available graphics accelerators from companies such as S3. Tseng. Weitek, and others. The digital system chip 112 may also include a dedicated MPEG (Motion Pictures Electronics Group) decoder (not shown).

The digital system chip 112 also includes an audio engine 204 which performs digital audio processing operations such as MIDI and wavetable synthesis, among others. the audio engine 204 performs operations similar to currently available sound cards such as SoundBlaster or SoundBlaster-compatible cards.

The digital system chip 112 also preferably includes a general purpose DSP engine 206 which is programmable to perform various functions. such as MPEG decoding, LZ compression, and other advanced video, audio, and/or communications functions. A read only memory (ROM) 207 is preferably coupled to the DSP Engine 206 which stores instructions for use by the DSP Engine 206. Alternatively, a non-volatile RAM or SRAM is used which receives downloadable instructions from the main memory 110. In one embodiment, the DSP engine 206 is a dedicated communication engine which performs digital communication operations. such as ISDN operations and/or telephony operations. In another embodiment, the digital system chip 112 includes a dedicated communication engine (not shown) in addition to the general purpose DSP engine 206, and the dedicated communication engine performs ISDN and/or telephony operations.

In one embodiment, the digital system chip 112 includes multimedia memory (not shown) for storing multimedia data, such as video data and audio data. The multimedia memory corresponds to video RAM (VRAM) found on current video accelerator cards, and is also used for storing audio data as well as other multimedia and communications data. The multimedia memory preferably comprises VRAM, DRAM (dynamic RAM), SRAM (static RAM), or EDO (extended data out) RAM, as desired. Alternatively, the multimedia memory is located off-chip and is coupled directly to the digital system chip 112.

In one embodiment, the digital system chip 112 does not include multimedia memory, but rather video data and audio data are stored in the system memory 110 according to a unified memory architecture. In this embodiment, the digital system chip 112 preferably includes a memory buffer 234 and a direct memory access (DMA) engine 236 for transferring data from the main memory 110 to the memory buffer 234 in the digital system chip 112.

In one embodiment, the video engine 202 and audio engine 204 couple through one or more I/O channels to respective digital I/O ports 232, including video and audio ports. The digital video port is included for providing digital video data to peripheral devices, such as an MPEG decoder or a digital video display. The digital audio port is included for providing digital audio data to digital peripheral devices, such as for external mixing, as desired. In an embodiment which includes a dedicated communication engine, the digital system chip 112 preferably includes one or more digital communication ports 232 for coupling to an ISDN line or other digital line.

As shown, the digital system chip 112 also preferably includes a USB (Universal Serial Bus) interface 222 for interfacing to a Universal Serial Bus. The Universal Serial Bus is a bus specification proposed by Microsoft and Intel which is designed to replace the various peripheral connectors on current PCs with a single connector for most peripherals, such as keyboards, mice, monitors, and other devices. The digital system chip 112 also preferably includes serial/parallel port interface logic 224 for providing a serial port and a parallel port. The serial/parallel port interface logic 224 preferably implements a universal asynchronous receiver/transmitter (UART). The digital system chip 112 also preferably includes a floppy controller interface 226 for interfacing to floppy drive 141. The digital system chip 112 may include other functions, including EIDE support and SCSI support.

In the preferred embodiment, the digital system chip 112 includes video processing circuitry and/or firmware comprised in the video engine 202, including the digital portion of a random access memory digital to analog converter (RAMDAC), including the random access memory (RAM) 260 of the RAMDAC. As described below, the analog system chip 114 preferably includes the analog portion of the RAMDAC and associated logic circuitry for converting video data into appropriate analog signals, preferably red, green and blue (RGB) signals, for output directly to video monitor 132, as described below.

The digital system chip 112 may also include various peripheral function logic 228, including an interrupt system, a real time clock (RTC) and timers, a direct memory access (DMA) system, and ROM/Flash memory. Other peripherals may be comprised in the peripheral function logic 228 in the digital system chip 112, including communications ports, diagnostics ports, command/status registers, and non-volatile static random access memory (NVSRAM). The digital system chip 112 also preferably includes modem logic which performs digital modulator and demodulator functions.

Alternate Embodiment

Figure 3:
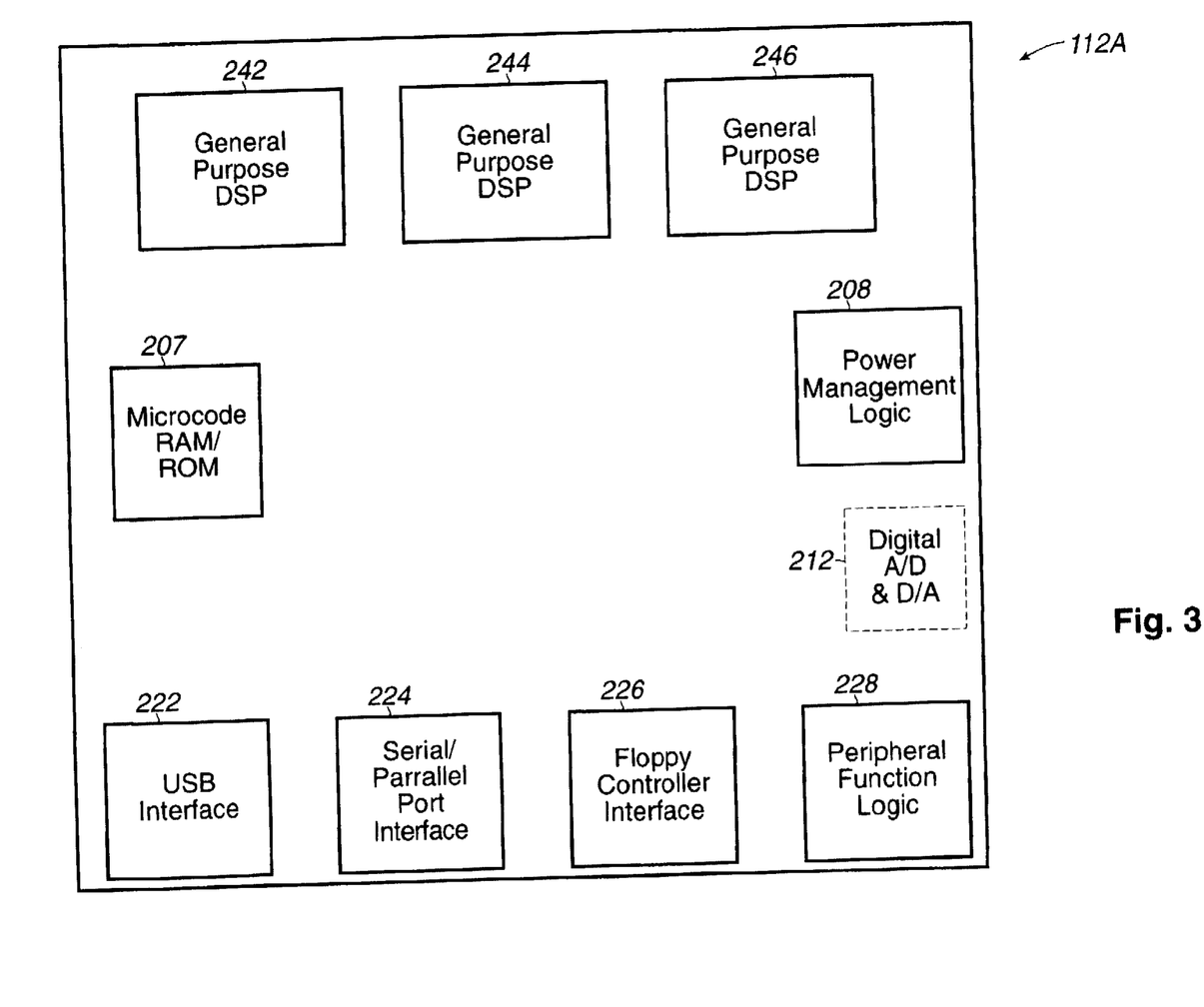
FIG. 3 is a block diagram of an alternate embodiment of the digital system chip of FIG. 1 according to the present invention.

Referring now to FIG. 3, in an alternate embodiment, digital system chip 112A includes one or more general purpose DSP engines, preferably three DSP engines 242, 244, and 246, which preferably perform video, audio and communication processing functions. In this embodiment, the DSP engine 242 performs video processing functions, the DSP engine 244 performs audio processing functions, and the DSP engine 246 performs communication processing functions as well as other real-time functions. In one embodiment, each DSP engine 242, 244, and 246 includes one or more ROMs or RAMs 207 which store microcode corresponding to video, audio and communications processing.

In one embodiment, the DSP engines 242, 244, and 246 are not assigned specific functions, but rather each DSP engine is dynamically assigned tasks such as video, audio or communications functions by a real-time operating system executing on the CPU 102. For example, in this embodiment, the Intel IA-Spox operating system executes on the CPU 102 to control the DSP engines in the digital system chip 112A and assigned tasks to each of the engines.

In an alternate embodiment, the digital system chip 112A includes only one DSP engine which preferably performs video and audio processing functions. In this embodiment, the DSP engine is a general purpose DSP engine that performs both video and audio processing functions as well as other real-time functions. In this embodiment, the single DSP engine includes one or more ROM or RAMs 207 which store microcode corresponding to video, audio and communication processing instructions, or receive downloadable microcode from the system memory 110.

Analog System Chip

Figure 4:
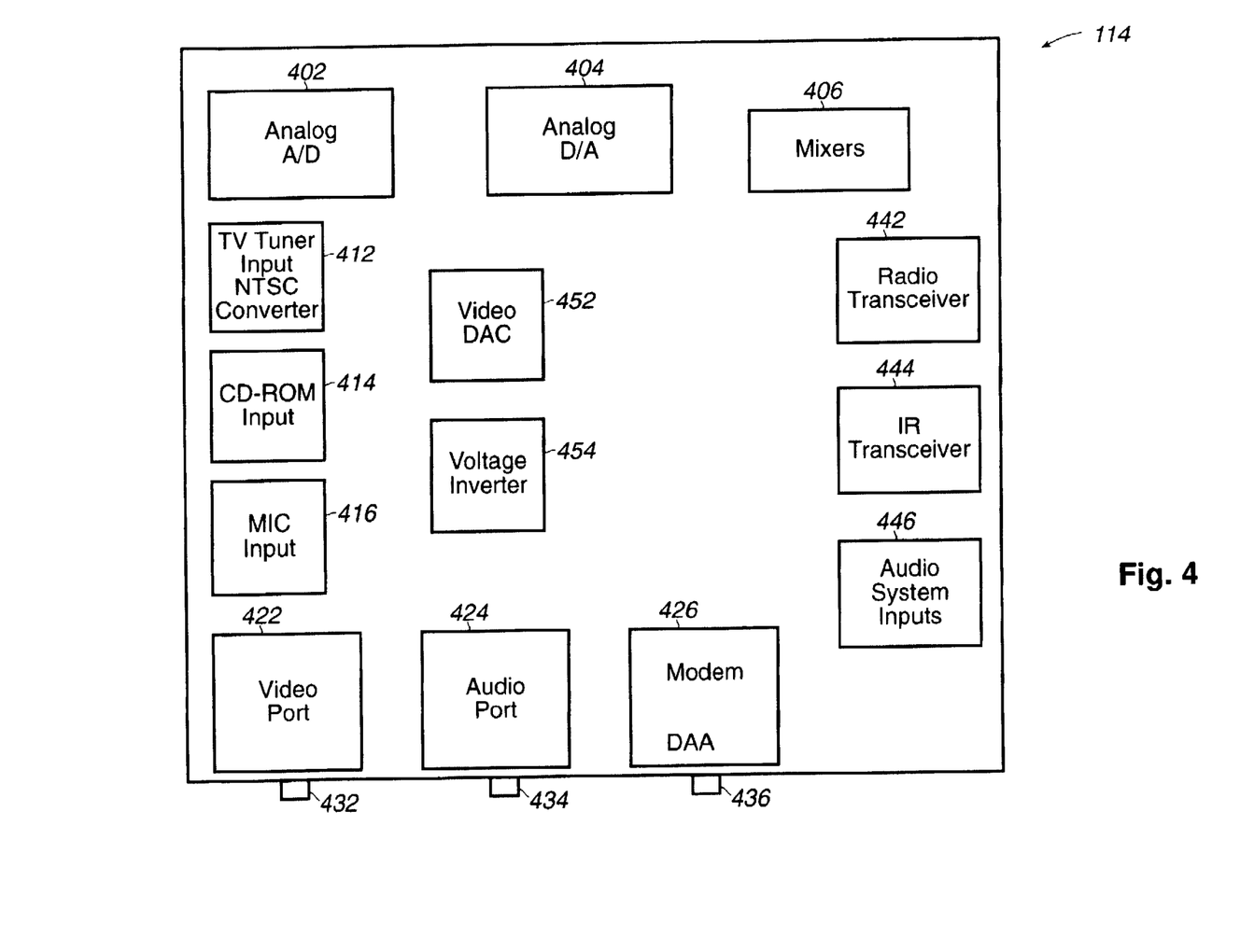
FIG. 4 is a block diagram of the analog system chip of FIG. 1.

Referring now to FIG. 4, the analog system chip 114 is shown. In the preferred embodiment shown in FIG. 4, the analog system chip 114 includes analog to digital (A/D) circuitry 402 and digital to analog (D/A) circuitry 404. The analog system chip 114 preferably includes A/D and D/A logic for video, audio, modem and telephone handset functionality. In the preferred embodiment, the analog system chip 114 include a single A/D converter and a single D/A converter for all of the above functions. Alternatively, the A/D circuitry block 402 and the D/A circuitry block 404 each include a plurality of A/D converters and a plurality of D/A converters, respectively, for each of the above functions.

In one embodiment, the analog system chip 114 includes only the analog circuitry portion of the A/D and D/A logic, and the digital portion of this logic is comprised in the digital system chip 112. Thus, assuming a simple sigma delta converter, the digital system chip 112 includes digital noise filter circuitry which moves in-band noise to out-of-band noise, as well as other digital A/D and D/A logic, and the analog system chip 114 includes the analog circuitry portion of the A/D and D/A which receives and/or produces the analog signals.

The analog system chip 114 also includes various input ports and input circuitry such as TV tuner input circuitry 412, CD-ROM input circuitry 414, and microphone input circuitry 416. The TV tuner input circuitry 412 includes a NTSC (National Television Standards Committee) converter. The CD-ROM input circuitry 414 is adapted for interfacing to a CD-ROM. The microphone input circuitry 416 is adapted for interfacing to a microphone.

The analog system chip 114 also includes a radio transceiver 442, an infrared (IR) transceiver 444, and a plurality of audio system inputs 446 for coupling to the outputs of an audio entertainment system. The analog system chip 114 also may include one or more line level inputs and synthesizer inputs, among others. The analog system chip 114 also includes mixers 406 for performing analog signal mixing and a voltage inverter 454, as well as one or more filters and digital tone control logic (not shown).

The analog system chip 114 includes video port circuitry 422 connected to video port 432 and audio port circuitry 424 connected to audio port 434. In one embodiment, the video channel between the video port circuitry 422 and video port 432 and the audio channel between the audio port circuitry 424 and the audio port 434 are preferably synchronized with each other to ensure synchronized audio and video during multimedia presentations.

The analog system chip 114 also includes modem circuitry 426 which connects to a modem port 436. The modem circuitry 426 preferably includes DAA (data access arrangement) logic, which is analog logic that interfaces between the modem and the phone line and performs ring detect, and two wire to four wire hybrid functions, among other functions.

In the preferred embodiment, as mentioned above, the digital system chip 112 includes video processing circuitry and/or firmware, including the digital portion of a random access memory digital to analog converter (RAMDAC). The analog system chip 114 preferably includes the analog portion of the RAMDAC and associated logic circuitry 452 for converting video data into appropriate analog signals, preferably red, green and blue (RGB) signals, for output directly to video monitor 132. The analog video DAC circuitry 452 may be comprised in the Analog D/A block 404, as desired.

Computer System Block Diagram—Alternate Embodiment

Figure 5:
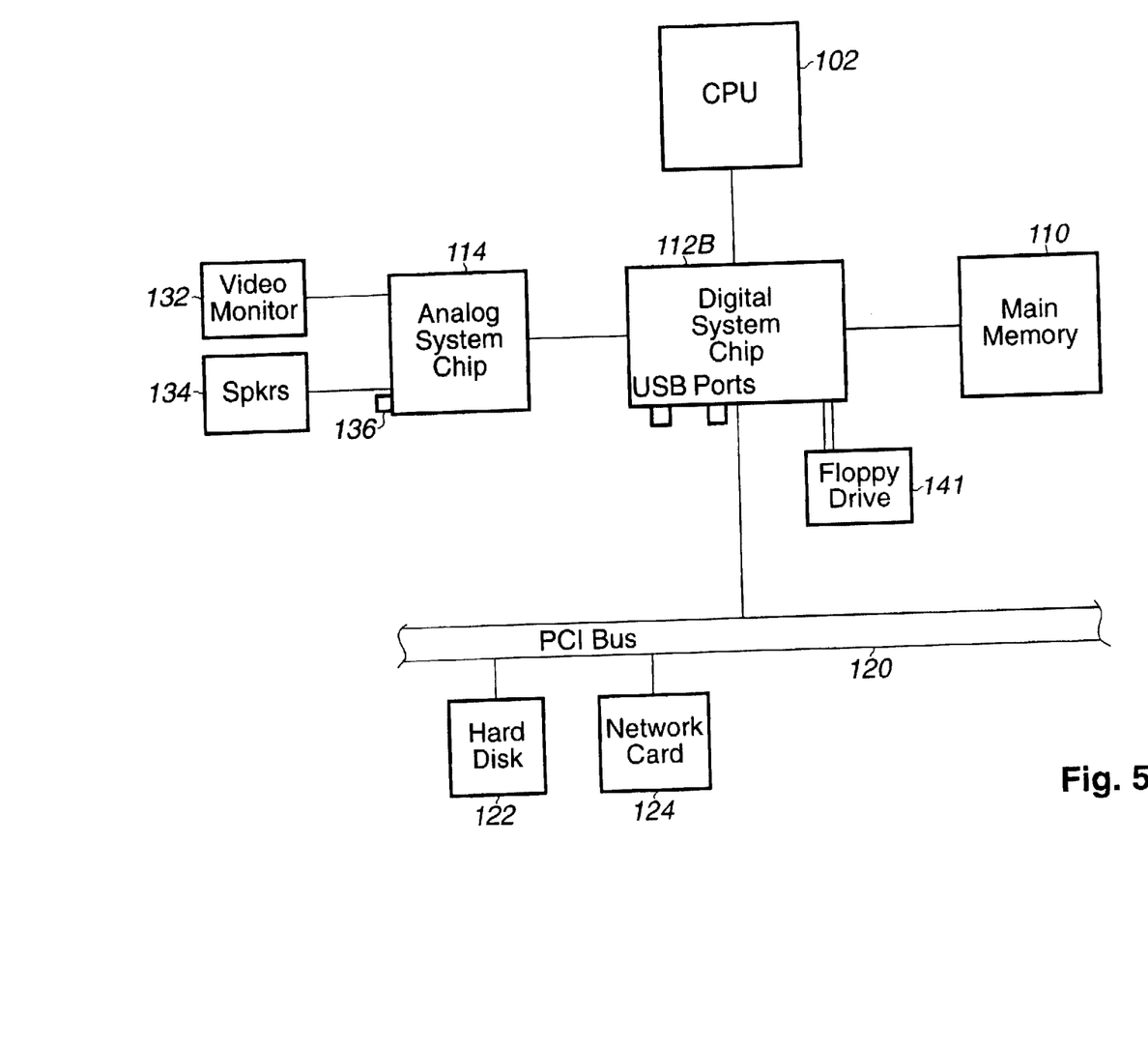
FIG. 5 is a block diagram of a computer system including a digital system chip and an analog chip according to an alternate embodiment of the present invention.

Referring now to FIG. 5, a block diagram of a computer system according to an alternate embodiment of the present invention is shown. As shown, the computer system includes a central processing unit (CPU) 102 which is coupled through a CPU local bus to digital system chip 112B. The digital system chip 112B includes host/PCI/cache bridge or chipset logic. The digital system chip 112B preferably includes a cache controller and also may include a second level or L2 cache memory. Alternatively, the L2 cache memory (not shown) is separate from the digital system chip 112B and coupled to the digital system chip 112B. The digital system chip 112B couples through a memory bus 108 to main memory 110. The main memory 110 is preferably DRAM (dynamic random access memory) or EDO (extended data out) memory, as desired.

The digital system chip 112B also interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120.

As described above, the digital system chip 112B performs various digital functions, including multimedia functions such as video and audio, as discussed further below. The digital system chip 112B includes a Universal Serial Bus (USB) interface as well as a parallel/serial port interface. The digital system chip 112B also preferably couples to floppy drives 142. Various other devices may be coupled to the digital system chip 112B, such as a hard drive or other digital devices.

Analog system chip 114 is coupled to the digital system chip 112B. The analog system chip 114 performs various analog functions as described above, including analog to digital (A/D) conversion, digital to analog (D/A) conversion, and modem functionality, among others. The analog system chip 114 is coupled to provide outputs to various analog devices, including a video monitor 132 and speakers 134. The analog system chip 114 also includes an analog modem output 136 for coupling to a telephone line. The analog system chip 114 also includes ports for coupling to various devices to receive various analog inputs, including a microphone 142, a CD-ROM 144, and a TV tuner 146. The analog system chip 114 is preferably identical to the analog system chip 114 described above. As noted above, the analog system chip 114 only receives the analog output from the CD-ROM 144.

Various devices may be coupled to the PCI bus 120. For example, a hard disk 122 and a network interface controller 124 are shown coupled to the PCI bus 120. A SCSI (small computer systems interface) adapter (not shown) may also be coupled to the PCI bus 120. In one embodiment, the digital system chip 112A includes a hard disk interface for coupling to a hard disk and a SCSI interface for coupling to SCSI devices. Various other devices may be connected to the PCI bus 120, as is well known in the art.

Expansion bus bridge logic (not shown) is also preferably coupled to the PCI bus 120. The expansion bus bridge logic interfaces to an expansion bus (not shown). The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus, such as expansion bus memory (not shown).

Digital System Chip Block Diagram

Figure 6:
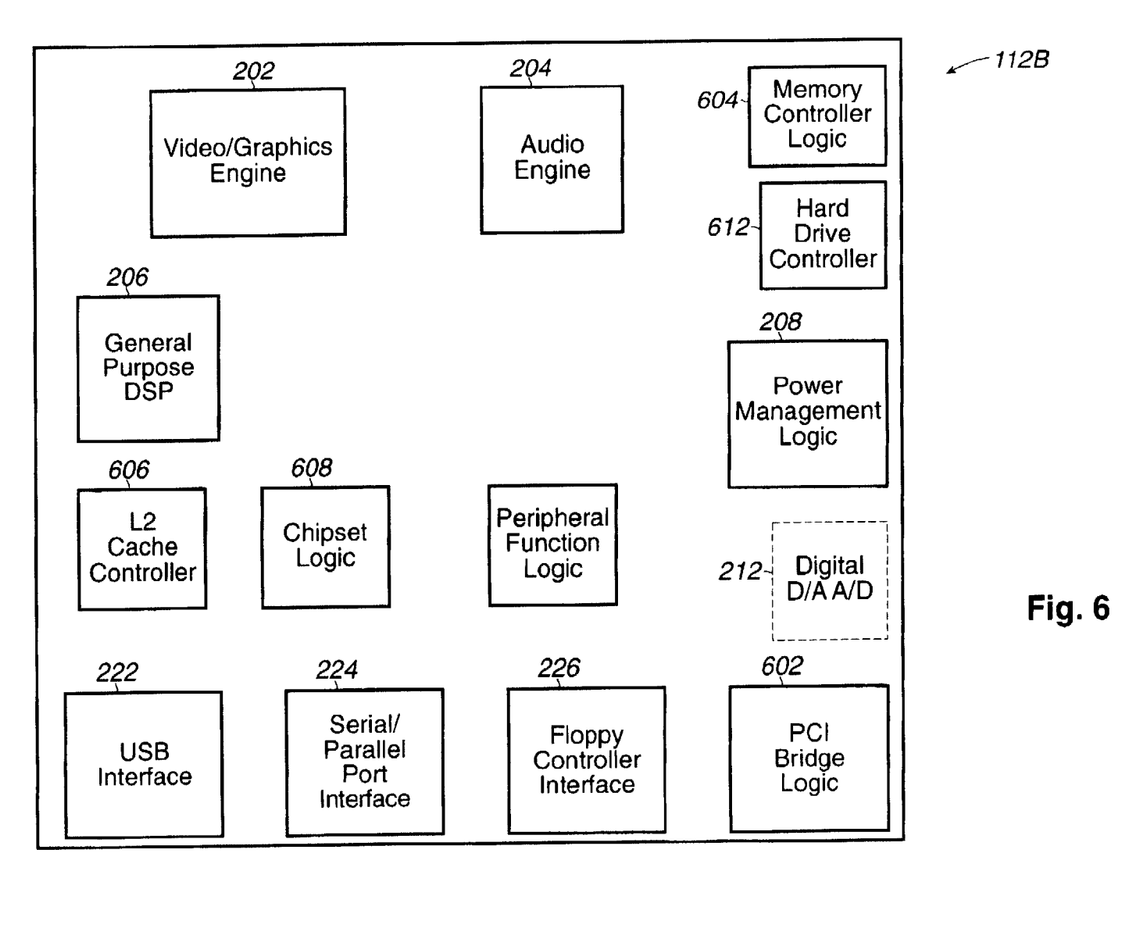
FIG. 6 is a block diagram of the digital system chip of FIG. 5.

Referring now to FIG. 6, a more detailed block diagram illustrating the digital system chip 112B in the embodiment of FIG. 5 is shown. The digital system chip 112B shown in FIG. 6 is similar to the digital system chip 112 shown in FIG. 2, except that the digital system chip 112B shown in FIG. 6 also includes PCI Bridge logic 602, memory controller logic 604, L2 cache controller logic 606, and chipset logic 608. The digital system chip 112B may also include optional hard drive controller logic 612, as shown.

The PCI Bridge logic 602 includes the necessary circuitry to interface to the PCI bus 120, including PCI arbitration logic, as is well known to those skilled in the art. The memory controller logic 604 interfaces to the main memory 110. The L2 cache controller logic 606 couples to a cache memory (not shown), preferably static RAM. The L2 cache controller logic 606 may implement various cache protocols, including a direct-mapped protocol, a two-way set associative protocol, or a four-way set associative protocol. Also, the L2 cache controller logic 606 may implement various write policies, including either write-through or write-back policies. The chipset logic 608 is preferably similar or identical to the logic in the Intel Triton chipset, referenced above.

Computer System Block Diagram—Alternate Embodiment

Figure 7:
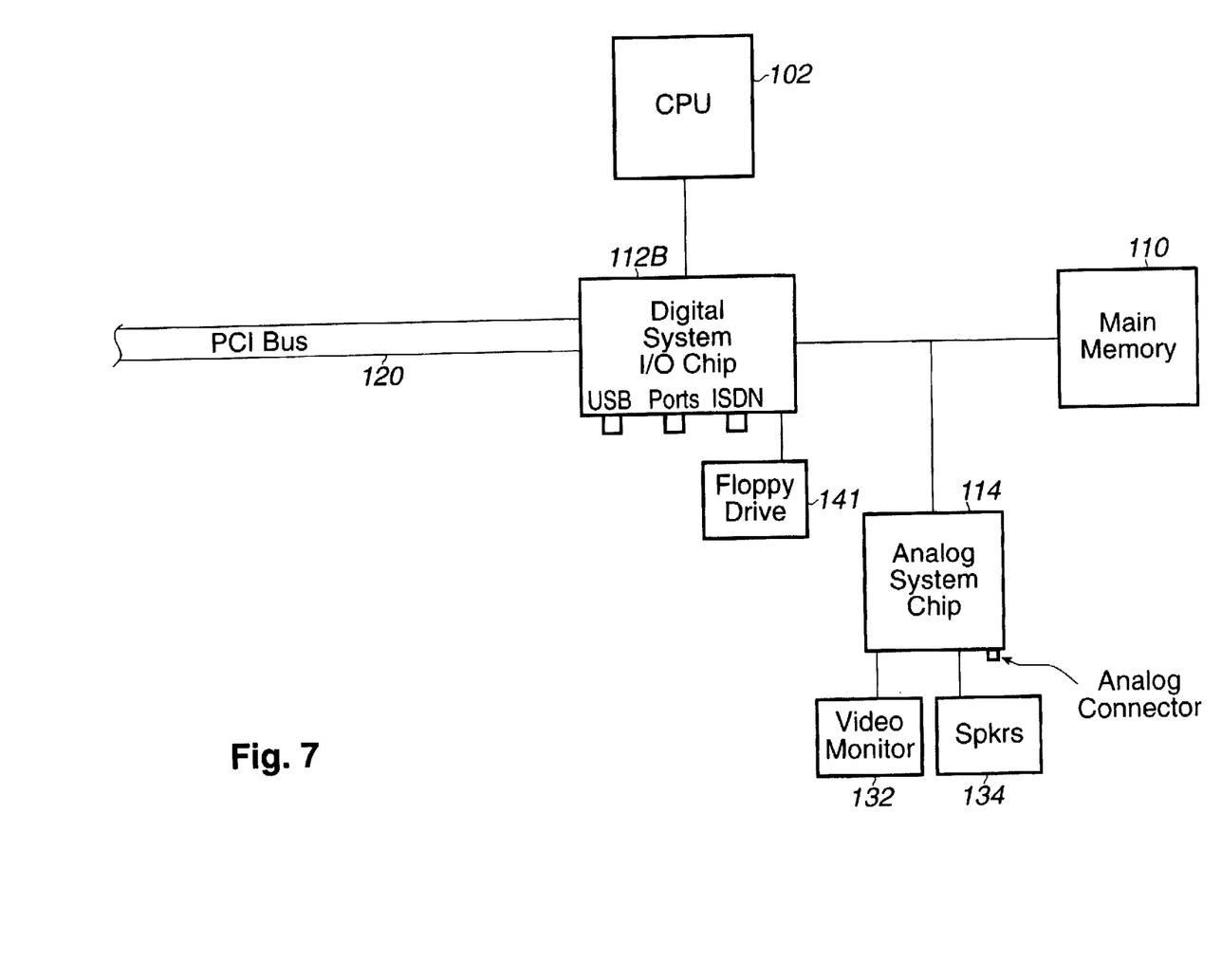
FIG. 7 is a block diagram of a computer system including a digital system chip and an analog chip according to a third embodiment of the present invention.

Referring now to FIG. 7, a block diagram of a computer system according to a third embodiment of the present invention is shown. As shown, this embodiment is similar to FIG. 5, except that in this embodiment the analog system chip 114 is coupled to the memory bus between the digital system chip 112B and the main memory 108. In this embodiment, the computer system preferably implements a unified memory architecture, also referred to as a unified frame buffer architecture, wherein the main memory 110 stores video, graphics and audio data, including the video frame buffer.

The digital system chip 112B preferably includes DMA Engine 236 which transfers video data from the video frame buffer in main memory 110 directly to the analog system chip 114. The analog system chip 114 converts the digital pixel data to RGB analog voltage signals to drive the video monitor 132. Likewise, the DMA Engine 236 transfers digital audio data from the main memory 110 directly to the analog system chip 114, and the analog system chip 114 converts the digital audio data to analog audio signals to drive the speakers 134. The DMA Engine 236 also preferably transfers digital communications data from the main memory 110 to the modem circuitry 426 in the analog system chip 114, and in response the modem converts the digital data to analog data and transmits the analog signals over a conventional telephone line.

Thus the digital system chip 112B performs video and audio data transfers from the main memory 110 directly to the analog system chip 114 and thus to the video monitor 132 and speakers 134. The digital system chip 112B also transfers communications data from the main memory 110 directly to the analog system chip 114. This provides improved performance for real-time multimedia and communications applications.

Computer System Block Diagram—PCI Bus Embodiment

Figure 8:
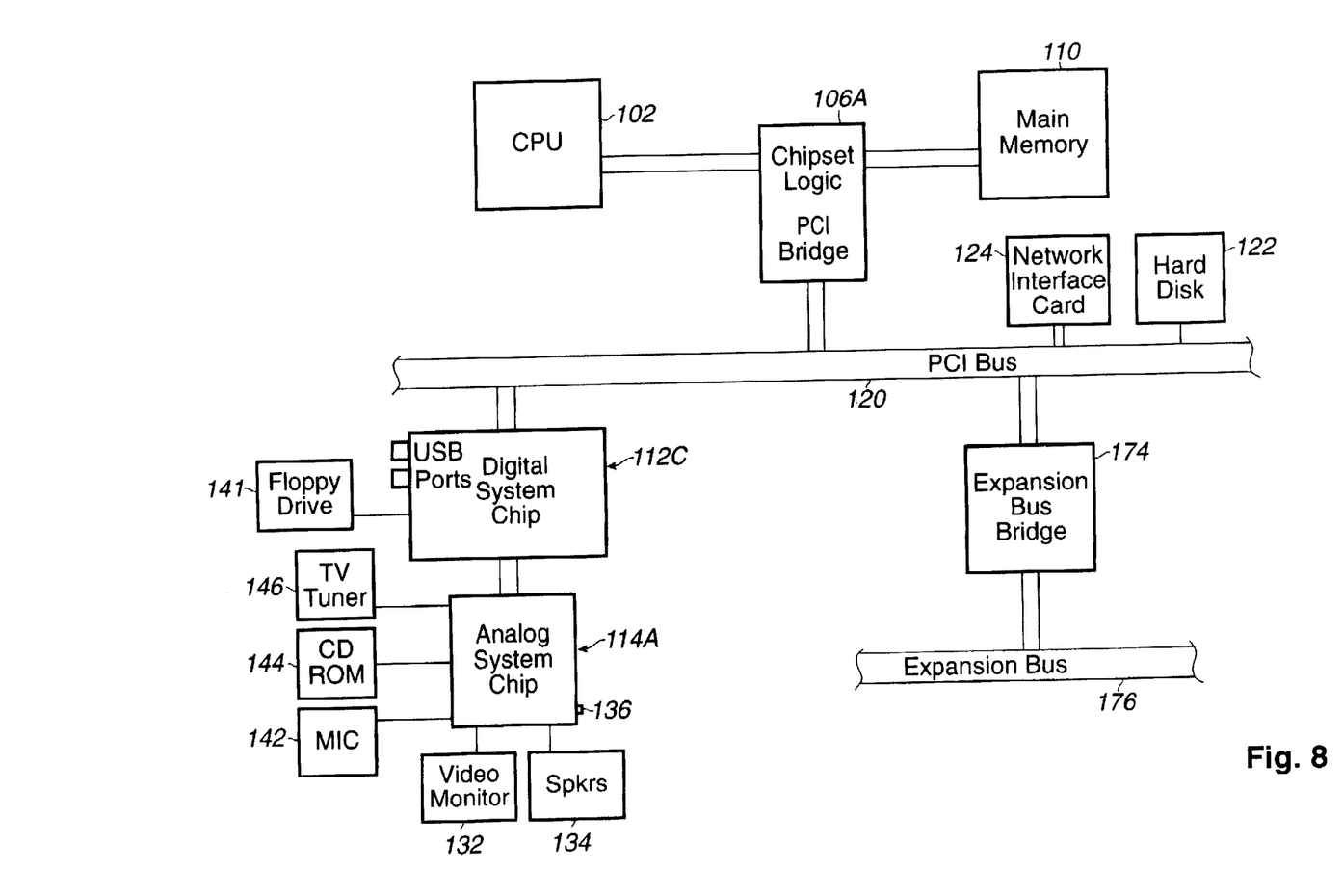
FIG. 8 is a block diagram of a computer system including digital and analog system chips coupled to a PCI expansion bus according to an alternate embodiment of the present invention.

Referring now to FIG. 8, a block diagram of a computer system according to an alternate embodiment of the present invention is shown. As shown, the computer system includes a central processing unit (CPU) 102 which is coupled through a CPU local bus to a host/PCI/cache bridge or chipset logic 106A. The chipset logic 106A is preferably similar to the Triton chipset available from Intel Corporation. A second level or L2 cache memory (not shown) may be coupled to a cache controller in the chipset, as desired. The bridge or chipset logic 106A couples through a memory bus to main memory 110. The main memory 110 is preferably DRAM (dynamic random access memory) or EDO (extended data out) memory, as desired.

The host/PCI/cache bridge or chipset 106A also interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120.

In the embodiment shown in FIG. 8, a digital system chip 112C according to the present invention is coupled to the PCI Bus 120. As discussed above, the digital system chip 112C performs various digital functions, including multimedia functions such as video and audio, as discussed further below. The digital system chip 112C preferably includes a Universal Serial Bus (USB) interface as well as a parallel/serial port interface. The digital system chip 112C also preferably couples to floppy drives 141. Various other devices may be coupled to the digital system chip 112C, such as a hard drive or other digital devices.

The digital system chip 112C includes a PCI interface for coupling directly to the PCI bus 120. Thus, the digital system chip 112C arbitrates for the PCI bus 120 and communicates directly with devices on the PCI bus 120 with less involvement of the chipset logic 106. The digital system chip 112C is also preferably coupled to other devices in the computer system to perform power management functions, as well as other functions, as desired.

An analog system chip 114A is coupled to the digital system chip 112C. The analog system chip 114A performs various analog functions, including analog to digital (A/D) conversion, digital to analog (D/A) conversion, and modem functionality, among others. The analog system chip 114A is coupled to provide outputs to various analog devices, including a video monitor 132 and speakers 134. The analog system chip 114A also includes an analog modem output 136 for coupling to a telephone line. The analog system chip 114A also includes ports for coupling to various devices to receive various analog inputs, including a microphone 142, a CD-ROM 144, and a TV tuner 146, among other devices.

Various other devices may be coupled to the PCI bus 120. For example, a hard disk 122 and a network interface controller 124 are shown coupled to the PCI bus 120. A SCSI (small computer systems interface) adapter (not shown) may also be coupled to the PCI bus 120. In one embodiment, the digital system chip 112C includes a hard disk interface for coupling to a hard disk and a SCSI interface for coupling to SCSI devices. In addition, the digital system chip 112C may also include network interface circuitry such as Ethernet or token ring circuitry for interfacing to a network. However, in the preferred embodiment, the digital system chip 112C does not include network circuitry, but rather network functions are performed by modular network card 124 coupled to the PCI bus 120. Various other devices may be connected to the PCI bus 120, as is well known in the art.

Expansion bus bridge logic 174 is also preferably coupled to the PCI bus 120. The expansion bus bridge logic 174 interfaces to an expansion bus 176. The expansion bus 176 may be any of may be any of varying types, including the industry standard architecture (ISA) bus, also referred to as the AT bus, the extended industry standard architecture (EISA) bus, or the microchannel architecture (MCA) bus. Various devices may be coupled to the expansion bus, such as expansion bus memory (not shown).

Figure 9:
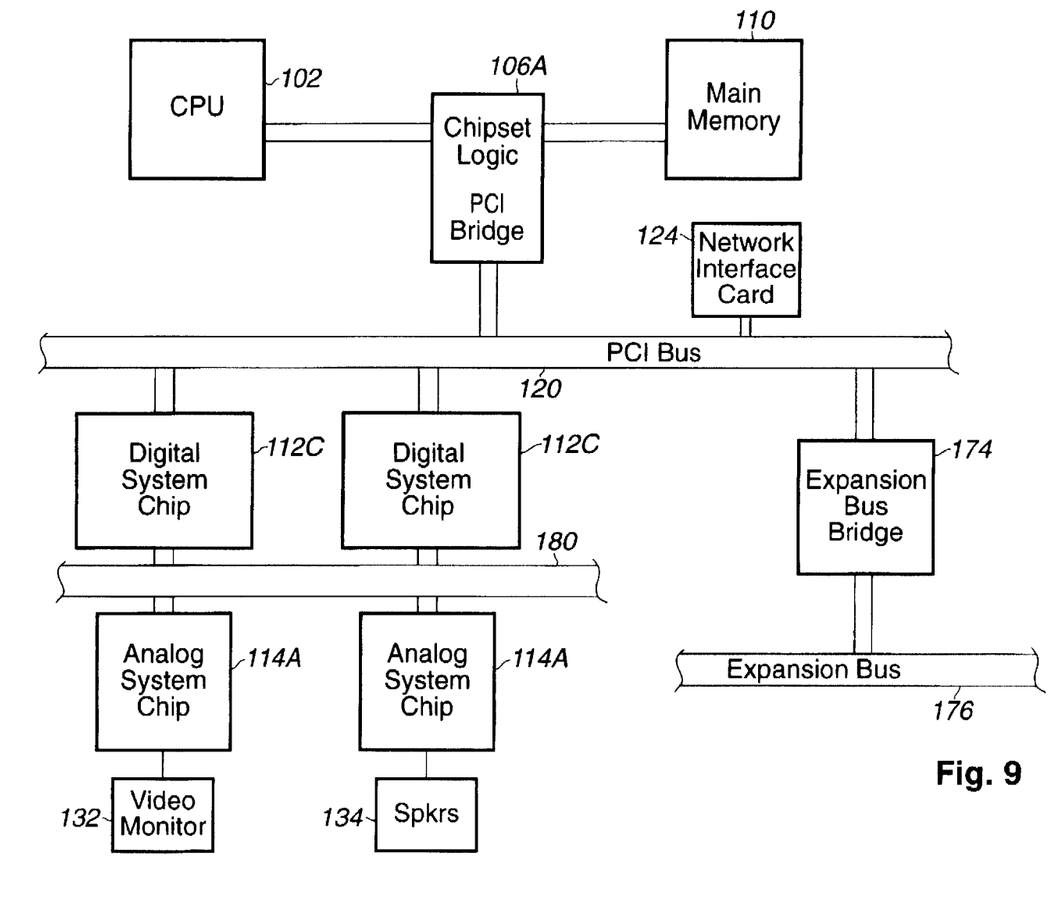
FIG. 9 illustrates the computer system of FIG. 8 including a plurality of digital and analog system chips, wherein the system includes a bus comprised between the digital and analog system chips.

FIG. 9—Alternate Embodiment

Referring now to FIG. 9, an alternate embodiment of the computer system of FIG. 8 is shown. As shown in FIG. 9, the computer system includes a plurality of digital system chips 112C, each coupled to the PCI bus 120. The computer system further includes a separate intermediate bus 180 which couples between the digital system chips 112C and one or more analog system chips 114A. The bus 180 provides a communication path between the one or more digital system chips 112C and the one or more analog system chips 114A. A video monitor 132 and speakers 134 are coupled to respective analog system chips 114A.

In one embodiment, at least one of the digital system chips 112C shown in FIG. 8 physically resides on the computer system motherboard and is electrically coupled to the PCI bus 120. The second digital system chip 112C is preferably comprised on a modular expansion card which is adapted for insertion into a PCI bus slot or connector which is coupled to the PCI bus 120. This allows for modular and upgradeable options for the computer system.

Figure 10:
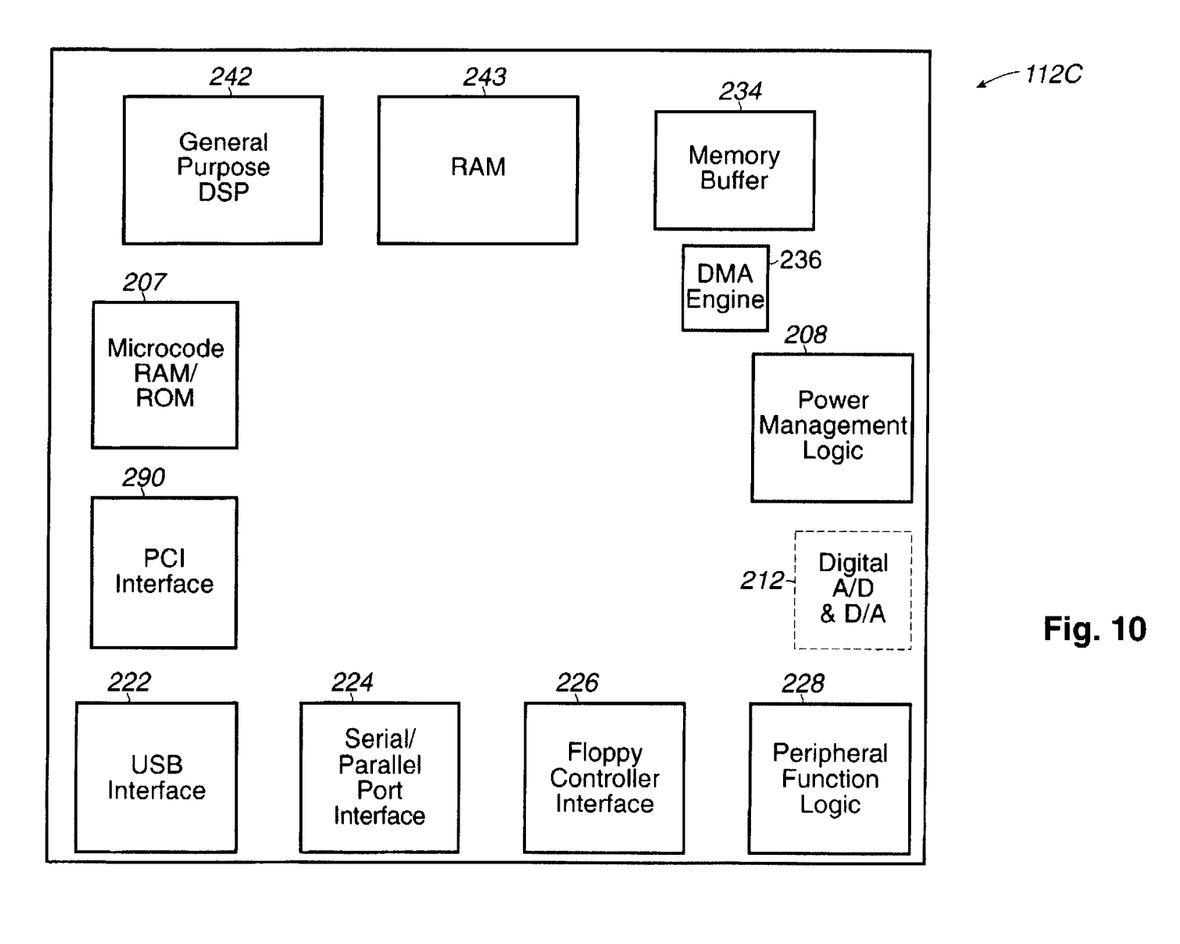
FIG. 10 is a block diagram of the digital system chip of FIGS. 8 and 9.

Referring now to FIG. 10, the digital system chip 112C is shown. The digital system chip 112C is preferably similar to the digital system chips shown in FIGS. 2, 3, and 6. As shown, each digital system chip 112C preferably comprises a single general purpose digital signal processor 242. The digital system chip 112C also preferably includes a DSP RAM 243 which stores data used by the DSP engine 242. The digital system chip 112C also includes a PCI Interface 290 as well as a memory buffer 234 and DMA engine 236.

When only one digital system chip 112C is coupled to the PCI bus 120, the single DSP engine 242 in the digital system chip 112C preferably performs all multimedia and communication functions, including video, audio and communications functions. If the user desires to add additional functionality to the computer system, the user simply adds one or more additional expansion cards each including a second digital system chip 112C, as shown, thus providing extra DSP resources to the computer system. When additional digital system chips 112C are added as shown in FIG. 9, a real-time operating system, such as IA-SPOX, from Intel Corporation, preferably operates on the CPU 102 to allocate tasks between the DSP engines 242 in the respective digital system chips 112C.

As shown in FIG. 9, and as described above with regard to the digital system chip 112C, at least one analog system chip 114A is preferably hardwired to the motherboard, and additional analog system chips 114A are comprised on modular expansion cards adapted for insertion into connector slots on the bus 180. The intermediate bus 180 preferably includes one or more connector slots for receiving analog system chip expansion cards. This allows the user to selectively add analog system chips 114A to provide additional analog signal throughput in the computer system as desired, thus allowing modularity and upgradability.

Figure 11:
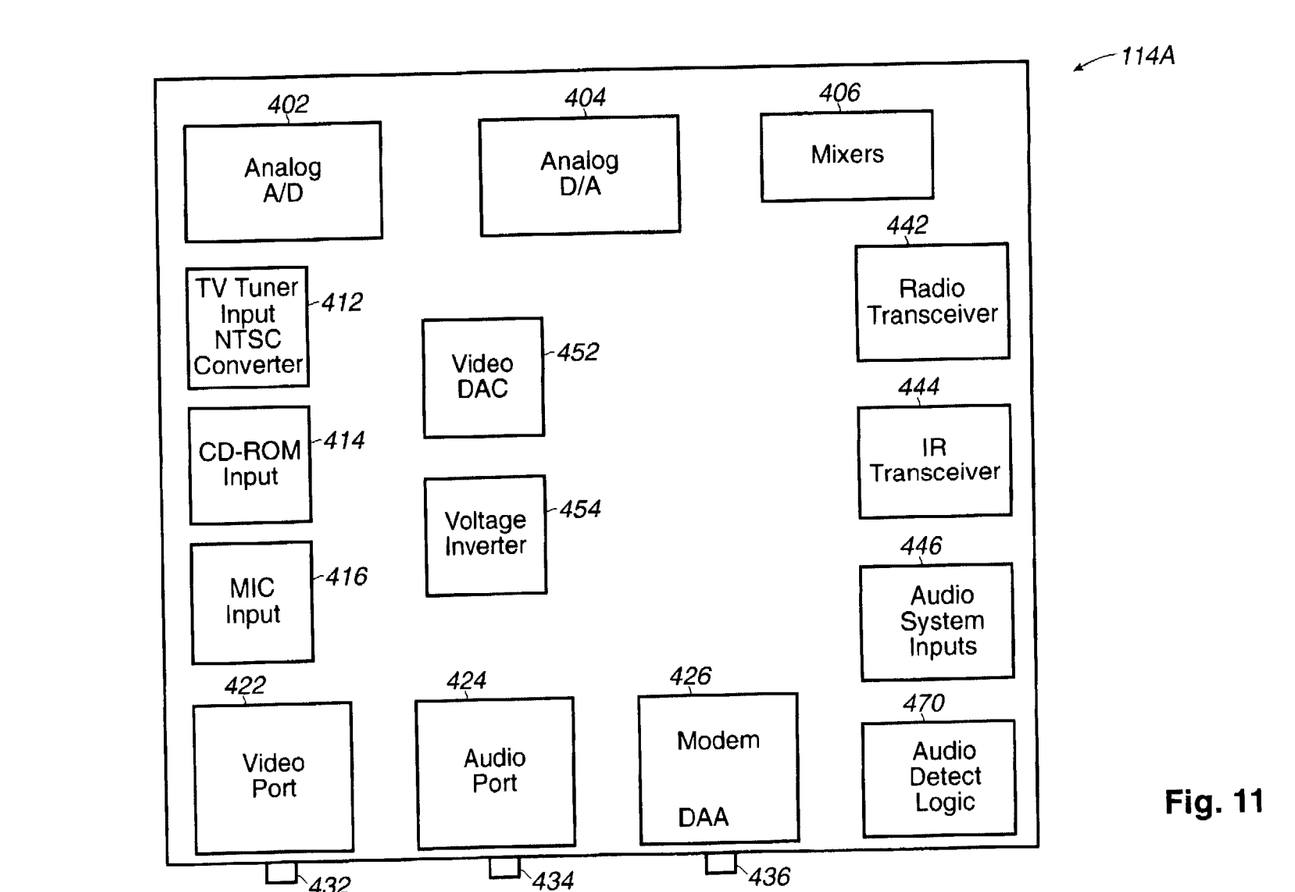
FIG. 11 is a block diagram of the analog system chip of FIGS. 8 and 9.

Referring now to FIG. 11, the analog system chip 114A is shown. The analog system chip 114A is preferably similar to the analog system chip 114 shown in FIG. 4. As shown, each analog system chip 114A preferably additionally comprises Auto Detect logic 470 which automatically detects when peripherals are coupled to the respective chip 114A.

According to the present invention, if additional analog system chips 114A are added to the system, and if additional peripherals are connected to the new analog system chips 114A, the computer system automatically detects the presence of the additional analog system chips 114A. Also, the Auto Detect logic 470 on the respective analog system chip 114A detects the peripheral that is connected to the chip and provides this information to the CPU 102. In response, the computer system automatically routes different analog signals between the chips 114A for improved performance.

For example, in an embodiment which includes only one analog system chip 114A, the monitor 132 and speakers 134 are preferably coupled to the single analog system chip 114A. If a second analog system chip 114A is added, and if the speakers 134 are moved to couple to the second analog system chip 114A, then the computer system automatically allocates the video signals to the first analog system chip 114A which is coupled to the video monitor 132, and the computer system automatically allocates analog audio signals to the second analog system chip 114A which couples to the speakers 134.

Thus, the computer system as shown in FIG. 9 comprises a PCI expansion bus 120 and a second bus 180. One or more digital system chips 112C are coupled to the PCI bus, and one or more analog system chips 114A are coupled to the intermediate bus 180. The intermediate bus 180 allows communication between the digital system chips 112C and the analog system chips 114A. The intermediate bus 180 also allows communication between two or more respective digital system chips 112C, as well as communication between two or more analog system chips 114A.

Conclusion

Therefore, the present invention comprises a novel computer system architecture which increases the performance of real-time applications. A dedicated digital system chip comprises various multimedia circuitry as well as chipset coupled directly to the main memory, and the digital system chip includes dedicated multimedia memory which is part of the main memory address space. This allows the multimedia memory to be used for multimedia data as well as for additional main memory storage.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:

a CPU;

chipset logic coupled to said CPU;

main memory coupled to said chipset logic which stores data accessible by the CPU;

a digital system chip coupled to said chipset logic, wherein said digital system chip comprises:

one or more DSP engines, wherein said one or more DSP engines process multimedia data and perform video and audio functions;

one or more input/output channels coupled to said one or more DSP engines for transmitting data; and an analog system chip coupled to said digital system chip, wherein said analog system chip receives digital data from said digital system chip, wherein said analog system chip comprises:

digital to analog conversion logic for converting digital data to analog data;

analog to digital conversion logic for converting analog data to digital data;

a video port coupled to said digital to analog conversion logic, wherein said video port is adapted for coupling to a video monitor; and an audio port coupled to said digital to analog conversion logic, wherein said audio port is adapted for transferring audio data to external speakers.

2. The computer system of claim 1, wherein said analog system chip substantially comprises only analog circuitry.

3. The computer system of claim 1, wherein said digital system chip substantially comprises only digital circuitry.

4. The computer system of claim 1, wherein said digital system chip includes a digital circuitry portion which performs digital filtering functions for digital to analog signal conversions and analog to digital signal conversions;

wherein said digital to analog conversion logic and said analog to digital conversion logic comprised in said analog system chip substantially comprise only analog circuitry portions for performing digital to analog signal conversions and analog to digital signal conversions.

5. The computer system of claim 1, wherein said digital system chip comprises:

a video engine for performing digital video and graphics operations;

an audio engine for performing digital audio processing functions.

6. The computer system of claim 5, wherein said digital system chip further comprises:

a digital communications engine for performing communication and telephony functions.

7. The computer system of claim 4, wherein said digital system chip further comprises:

a general purpose DSP engine for performing programmable digital signal processing functions.

8. The computer system of claim 1, wherein said one or more DSP engines in said digital system chip comprise a plurality of general purpose DSP engines;

wherein said digital system chip further comprises:

a memory coupled to at least one of said plurality of general purpose DSP engines which stores instructions for said at least one of said plurality of general purpose DSP engines.

9. The computer system of claim 1, wherein said digital system chip further comprises:

power management logic for performing power management operations in the computer system.

10. The computer system of claim 1, wherein said digital system chip further comprises:

a universal serial bus interface for interfacing to a universal serial bus.

11. The computer system of claim 1, wherein said digital system chip further comprises:

one or more serial ports; and one or more parallel ports.

12. The computer system of claim 1, wherein said digital system chip includes:

floppy controller interface logic adapted for coupling to a floppy drive; and hard disk interface logic adapted for coupling to a hard drive.

13. The computer system of claim 1, wherein said digital system chip includes:

modem circuitry for performing modulator and demodulator functions.

14. The computer system of claim 1, wherein said analog system chip further includes:

microphone input circuitry for receiving an analog microphone input; and

CD-ROM analog input circuitry for receiving an analog CD-ROM input.

15. The computer system of claim 12, wherein said analog system chip further includes:

television tuner input circuitry for receiving an analog television input.

16. The computer system of claim 12, wherein said analog system chip further includes:

radio transceiver input circuitry for receiving an analog radio signal input.

17. The computer system of claim 12, wherein said analog system chip further includes:

infrared transceiver input circuitry for receiving an analog infrared signal input.

18. The computer system of claim 1, wherein said computer system further includes:

a video monitor coupled to said video port of said analog system chip; and one or more speakers coupled to said audio port of said analog system chip.

19. A computer system, comprising:

a CPU;

a digital system chip coupled to said CPU, wherein said digital system chip comprises:
one or more DSP engines, wherein said one or more DSP engines process multimedia data and perform video and audio functions;
one or more input/output channels coupled to said one or more DSP engines for transmitting data; and
local bus bridge logic for coupling to a local bus;

main memory coupled to said digital system chip which stores data accessible by the CPU;

an analog system chip coupled to said digital system chip, wherein said analog system chip receives digital data from said digital system chip, wherein said analog system chip comprises:
digital to analog conversion logic for converting digital data to analog data;
analog to digital conversion logic for converting analog data to digital data;
a video port coupled to said digital to analog conversion logic, wherein said video port is adapted for coupling to a video monitor; and
an audio port coupled to said digital to analog conversion logic, wherein said audio port is adapted for transferring audio data; and a local expansion bus coupled to said digital system chip for receiving expansion devices.

20. The computer system of claim 19, wherein said analog system chip substantially comprises only analog circuitry.

21. The computer system of claim 19, wherein said digital system chip substantially comprises only digital circuitry.

22. The computer system of claim 19, wherein said digital system chip includes a digital circuitry portion which performs digital filtering functions for digital to analog signal conversions and analog to digital signal conversions;

wherein said digital to analog conversion logic and said analog to digital conversion logic comprised in said analog system chip substantially comprise only analog circuitry portions for performing digital to analog signal conversions and analog to digital signal conversions.

23. The computer system of claim 19, wherein said digital system chip comprises:

a video engine for performing video and graphics operations;

an audio engine for performing digital audio processing functions.

24. The computer system of claim 23, wherein said digital system chip further comprises:

a digital communications engine for performing communication and telephony functions.

25. The computer system of claim 23, wherein said digital system chip further comprises:

a general purpose DSP engine for performing programmable digital signal processing functions.

26. The computer system of claim 19, wherein said one or more DSP engines in said digital system chip comprise a plurality of general purpose DSP engines;

wherein said digital system chip further comprises:
a memory coupled to at least one of said plurality of general purpose DSP engines which stores microcode instructions for said at least one of said plurality of general purpose DSP engines.

27. The computer system of claim 19, wherein said digital system chip further comprises:

a memory controller which is coupled to said main memory; and an L2 cache controller for performing cache management functions;

wherein the computer system includes an L2 cache memory coupled to the L2 cache controller comprised in the digital system chip.

28. The computer system of claim 19, wherein said digital system chip further comprises:

power management logic for performing power management operations in the computer system;

a universal serial bus interface for interfacing to a universal serial bus;

one or more serial ports; and one or more parallel ports.

29. The computer system of claim 19, wherein said digital system chip includes:

floppy controller interface logic adapted for coupling to a floppy drive; and hard disk interface logic adapted for coupling to a hard drive.

30. The computer system of claim 19, wherein said digital system chip includes:

modem circuitry for performing modulator and demodulator functions.

31. The computer system of claim 19, wherein said analog system chip further includes:

microphone input circuitry for receiving an analog microphone input; and

CD-ROM analog input circuitry for receiving an analog CD-ROM input.

32. The computer system of claim 19, wherein said analog system chip further includes:

television tuner input circuitry for receiving an analog television input;

radio transceiver input circuitry for receiving an analog radio signal input; and infrared transceiver input circuitry for receiving an analog infrared signal input.

* * * * *